United States Patent [19]
Pia

[11] Patent Number: 6,061,951
[45] Date of Patent: May 16, 2000

[54] MUSHROOM BED COVER

[75] Inventor: Richard E. Pia, Kennett Square, Pa.

[73] Assignee: Gourmet's Delight Mushroom Co., Inc., Avondale, Pa.

[21] Appl. No.: 09/096,795

[22] Filed: Jun. 12, 1998

Related U.S. Application Data

[60] Provisional application No. 60/049,643, Jun. 16, 1997.
[51] Int. Cl.$^7$ .................................................. A01G 1/04
[52] U.S. Cl. ................................................................. 47/1.1
[58] Field of Search .................................... 47/1.1, 29, 31, 47/58.1

[56] References Cited

U.S. PATENT DOCUMENTS

| | | | |
|---|---|---|---|
| 4,443,969 | 4/1984 | Hannacek et al. | 47/1.1 |
| 4,798,023 | 1/1989 | Morssinkhof et al. | 47/28 X |
| 4,873,195 | 10/1989 | Kubo et al. | 435/254 |

FOREIGN PATENT DOCUMENTS

| | | | |
|---|---|---|---|
| 0196048 | 10/1986 | European Pat. Off. | 47/29 |
| 2043420 | 10/1980 | United Kingdom | 47/1.1 |

*Primary Examiner*—Michael J. Carone
*Assistant Examiner*—Jeffrey L. Gellner
*Attorney, Agent, or Firm*—Connolly Bove Lodge & Hutz LLP

[57] ABSTRACT

A plastic film covers the compost in a mushroom bed during the spawn run step of the mushroom growing procedure. It is during this step that the spawn begins to colonize the compost with mycelium. The plastic cover is vented by having a pattern of symmetrically arranged holes throughout its area so as to prevent or minimize moisture loss and prevent airborne pathogens from landing on the compost. The vented cover also reduces the $CO_2$ level while increasing the oxygen rate.

15 Claims, 1 Drawing Sheet

MUSHROOM BED COVER

CROSS-REFERENCE TO RELATED APPLICATION

This application is based on provisional application Ser. No. 60/049,643, filed Jun. 16, 1997.

BACKGROUND OF THE INVENTION

Mushroom growing includes various basic steps which occur during generally fixed time periods. Basically the procedures for mushroom growing are the following:

| | |
|---|---|
| 1) Outside composting. | |
| 2) Filling of the growing rooms with compost. | 1 day |
| 3) Pasteurization of the compost in the growing rooms. | 10 days |
| 4) Application of mushroom spawn (seed) and supplements onto the mushroom growing beds or trays and mixing throughout the compost. | 1 day |
| 5) Spawn run. During this time frame the spawn begins to colonize the compost with mycelium. | 14 days |
| 6) Casing the fully colonized compost with peat moss. | 1 day |
| 7) Pinhead formation and fruiting of mushrooms. | 18 days |
| 8) Picking and caring for the crop. | 23 days |

It is known that if mushroom beds are covered with a solid plastic film on the same day the spawn is mixed into the compost (see Step 4 above) and kept there during the spawn run (see Step 5 above) there are many advantages. One of the most important advantages is that it prevents moisture loss in the compost which in turn increases mushroom production. Another advantage is that it keeps airborne pathogens from landing on the compost and causing disease. The plastic film is removed after spawn run on the day of Casing (see Step 6 above). There are, however, some disadvantages. One of the disadvantages is that the compost temperatures tend to run hotter which increases the cooling capacity needed, which in turn increases energy costs. Another disadvantage is that the $CO_2$ level in the compost gets too high.

In recent years many mushroom farms around the world have had devastating crop losses by a new strain of green mold. This strain of green mold causes severe crop losses and in some cases no crop whatsoever. Many mushroom farms have gone out of business due to this disease because the disease is airborne and it is extremely hard to keep these airborne spores out of new growing rooms. This disease has been as devastating to the mushroom crop as the weevil was to the cotton crop.

SUMMARY OF THE INVENTION

An object of this invention is to improve the manner of covering mushroom beds to take advantage of prior techniques while adding improvements.

A further object of this invention is to provide a cover for mushroom beds which avoids the spreading of airborne spores such as from green mold.

In accordance with this invention a cover is used which includes air vents, preferably located in a symmetrical pattern throughout the cover.

THE DRAWINGS

DETAILED DESCRIPTION

Figure 2:
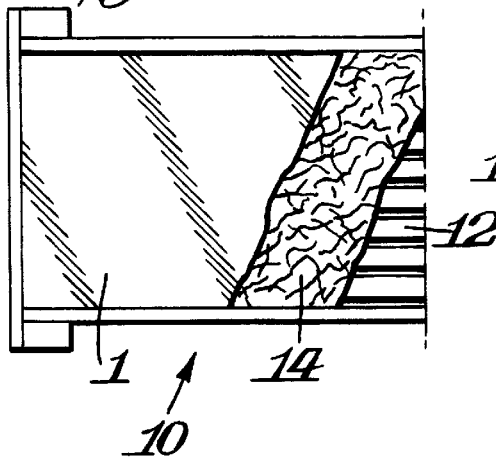
FIG. 2 is a fragmental top plan view showing a prior art cover for mushroom beds.

FIG. 2 illustrates a mushroom bed 10 of conventional construction. As shown therein bed 10 includes bed boards 12 over which the compost 14 is placed. A cover 1 in the form of a solid imperforate plastic film is placed over the compost completely covering the compost. While the cover 1 has the advantages of preventing moisture loss in the compost and the advantage of keeping airborne pathogens from landing on the compost and causing disease, such prior art cover tends to run the temperatures undesirably hot which increases the cooling capacity needed thereby resulting in increasing energy costs.

The present invention is based upon the recognition that the incidence of green mold disease is exacerbated by excessively high $CO_2$ rates and low oxygen rates during the spawn run. Such high $CO_2$ level in the compost is a disadvantage resulting from the imperforate cover 1 used by the prior art. The invention involves the provision of a cover 16 (shown in FIG. 1) which may also be made of a plastic film, but which includes a series of holes or vents 18 which can be selected in size and location to control the $CO_2$ rates and oxygen rates during spawn so as to lower the rate of green mold. Cover 16 would be used during the spawn run to allow a lower $CO_2$ rate and a higher oxygen rate. As a result, cover 16 provides all of the advantages of the prior art imperforate cover 1, while eliminating their disadvantages, namely, excessively high $CO_2$ content and overheating.

Figure 1:
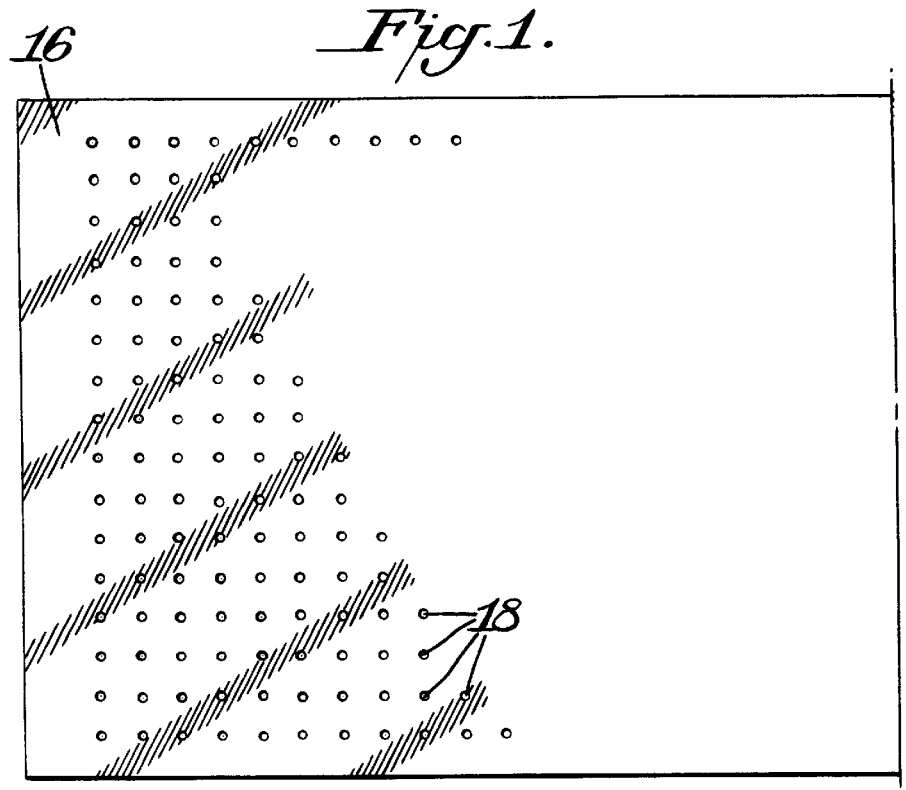
FIG. 1 is a fragmental top plan view of a mushroom bed cover in accordance with this invention.
Figure 3:
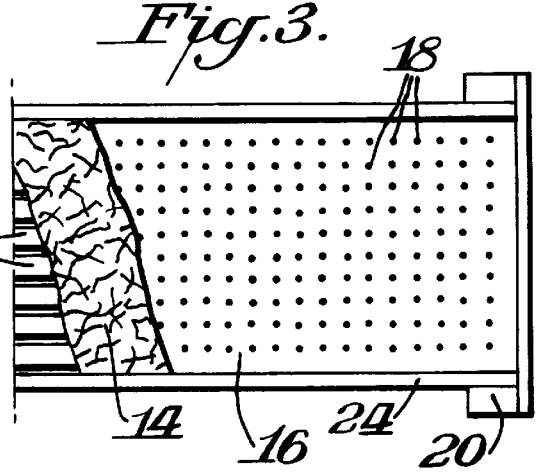
FIG. 3 is a view similar to FIG. 2 showing the cover of FIG. 1 on a mushroom bed.

FIGS. 1 and 3 illustrate the holes 18 to be symmetrically located in a uniform pattern throughout the area of cover 16 that covers the compost 14. For example, on a cover 16 which is 65 inches wide (or can be of any suitable length) ¼ inch diameter holes are located approximately 3–4 inches from center to center with the cover being, for example, 60 feet long. The cover can be over any length and width. The holes and their center to center distance can have other dimensions. Any pattern or random arrangement of holes (and dimensions) can be used in the broad practice of the invention. Preferably a symmetrical arrangement of uniform size holes is used.

Figure 4:
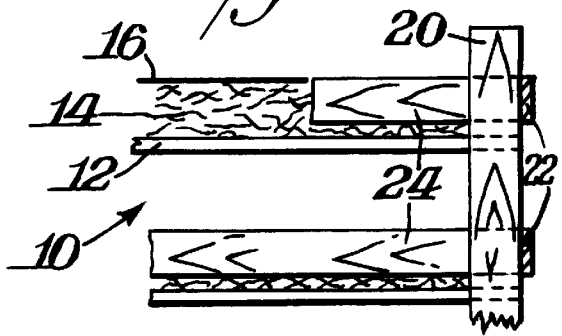
FIG. 4 is a fragmental side elevational view of the mushroom bed shown in FIG. 3.

FIG. 4 illustrates in side view a typical mushroom bed 10 which utilizes the cover 16. As shown therein posts 20 are provided for mounting two sets of beds shown by end boards 22 and side boards 24 with the compost 14 being on the bed boards 12. FIG. 4 illustrates a vented cover sheet 16 on the upper bed. The cover sheet 16 disposed in contact with the compost on the lower bed is not shown because it is below the upper edge of side board 24.

The use of a vented cover sheet has resulted in a lowering of $CO_2$ rates by 25% which substantially reduces, if not eliminates, the incidence of green mold.

Although the main object of vented cover sheet 16 was to lower the $CO_2$ rates and increase the oxygen rates during spawn run, there have been other advantages which are particularly unexpected. Once such advantage is that the bed temperatures run cooler, which is of great economic benefit. Another advantage is that there is less moisture loss during the spawn run, which has a direct relationship to the amount of production per cropping area. Such moisture loss is even less than with the prior art imperforated solid film. This advantage with the invention results from less air to compost temperature differential, which means less moisture evaporation. The end result in the use of vented cover 16 is increased production of mushrooms per cropping area.

What is claimed is:

1. In a mushroom bed assembly comprising a set of bed boards forming the body of a bed, an upstanding side board on each side of said bed boards, and compost on said bed boards between said side boards, the improvement being in that a cover is disposed over said compost, and said cover having a plurality of spaced holes of larger than micropore size extending completely therethrough comprising air vents to minimize moisture loss and lower $CO_2$ rates and reduce the incidence of green mold, and said holes being in a pattern extending across said cover in both the transverse and longitudinal directions.

2. The assembly of claim 1 wherein said holes are disposed in a uniform pattern.

3. The assembly of claim 2 wherein said holes are symmetrically arranged and of uniform size.

4. The assembly of claim 3 wherein said cover is a plastic film.

5. The assembly of claim 4 including a plurality of said beds disposed in vertical alignment spaced from each other.

6. The assembly of claim 1 wherein said cover is in direct contact with said compost.

7. The assembly of claim 1 wherein said holes are of about ¼ inch diameter.

8. The assembly of claim 1 wherein said cover is disposed completely over said compost without any intervening structure.

9. The assembly of claim 1 wherein said holes extend directly through said cover.

10. In a method of growing mushrooms including the steps of composting, pasteurization, mushroom spawn application, and spawn run wherein compost containing spawn is in a mushroom bed, the improvement being in covering the compost during the spawn run with a film incorporating a plurality of vent holes larger than micropore size extending through the film to reduce $CO_2$ level and minimize moisture loss and reduce incidence of green mold, and providing the holes in a pattern across the film in both the transverse and longitudinal directions.

11. The method of claim 10 including mounting the film in direct contact with the compost.

12. In a method of growing mushrooms including the steps of composting, pasteurization, mushroom spawn application, and spawn run wherein compost containing spawn is in a mushroom bed, the improvement being in covering and directly surface to surface contacting the compost during the spawn run with a film incorporating a plurality of vent holes extending through the film to reduce $CO_2$ level and minimize moisture loss and reduce incidence of green mold.

13. In a mushroom bed assembly comprising a set of bed boards forming the body of a bed, an upstanding side board on each side of said bed boards, and compost on said bed boards between said side boards, the improvement being in that a cover is disposed over and in direct surface to surface contact with said compost, and said cover having a plurality of spaced holes extending completely therethrough comprising air vents to minimize moisture loss and lower $CO_2$ rates and reduce the incidence of green mold.

14. The assembly of claim 13 including a plurality of said beds disposed in vertical alignment spaced from each other.

15. The assembly of claim 13 wherein said cover is disposed completely over said compost without any intervening structure.

* * * * *